United States Patent
Haupt et al.

(10) Patent No.: US 6,699,962 B2
(45) Date of Patent: Mar. 2, 2004

(54) PROCESS AND DEVICE FOR EXTRACTING POLYAMIDE

(75) Inventors: Heinrich Haupt, Krefeld (DE); Dieter Göbbels, Kempen (DE); Konrad Triebeneck, Bergisch Gladbach (DE); Andreas Gittinger, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 2 days.

(21) Appl. No.: 10/146,320

(22) Filed: May 15, 2002

(65) Prior Publication Data

US 2003/0004305 A1 Jan. 2, 2003

(30) Foreign Application Priority Data

May 21, 2001 (DE) .......................................... 101 24 579

(51) Int. Cl.$^7$ ................................................ C08F 6/00
(52) U.S. Cl. ....................... 528/480; 528/316; 528/323; 528/481; 528/499
(58) Field of Search ................................. 528/316, 323, 528/480, 481, 486, 499

(56) References Cited

U.S. PATENT DOCUMENTS

| 3,741,939 | A |   | 6/1973 | Wittmer et al. | 260/78 L |
| 4,293,494 | A | * | 10/1981 | Senni et al. | 540/540 |
| 5,169,582 | A |   | 12/1992 | Illing | 204/141 |
| 5,525,725 | A | * | 6/1996 | Higashio et al. | 540/536 |
| 6,353,100 | B1 | * | 3/2002 | Guit et al. | 540/538 |

FOREIGN PATENT DOCUMENTS

| DE | 43 24 616 | 1/1995 |
| DE | 195 05 150 | 8/1996 |

* cited by examiner

Primary Examiner—Terressa Boykin
(74) Attorney, Agent, or Firm—Joseph C. Gil; Gary Matz; Aron Preis

(57) ABSTRACT

A process for removing low molecular weight constituents from polyamide 6 or from copolyamides based on caprolactam (herein (co)polyamide) is disclosed. The process comprise subjecting the (co)polyamide to liquid-extraction at a temperature which is above the boiling point of the liquid at atmospheric pressure said liquid containing water in an amount of at least 80 percent relative to its weight.

6 Claims, No Drawings

PROCESS AND DEVICE FOR EXTRACTING POLYAMIDE

FIELD OF THE INVENTION

The present invention provides a process and a device for removing low molecular weight constituents from polyamide 6 or from copolyamides based on caprolactam (herein (co)polyamides) by extraction.

The present invention also provides a process and a device for preparing (co)polyamides).

SUMMARY OF THE INVENTION

A process for removing low molecular weight constituents from polyamide 6 or from copolyamides based on caprolactam (herein (co)polyamide) is disclosed. The process comprise subjecting the (co)polyamide to liquid-extraction at a temperature which is above the boiling point of the liquid at atmospheric pressure said liquid containing water in an amount of at least 80 percent relative to its weight.

BACKGROUND OF THE INVENTION

Polyamides, their preparation and their use as industrial plastics are known. They are described, for example, in "Kunststoff-Handbuch" edited by G. W. Becker and D. Braun, published by Hanser-Verlag in Munich and Vienna 1998, vol. 3 "Technische Thermoplaste", section 4 "Polyamide".

The present invention provides polyamide 6 and copolyamides based on caprolactam. Polyamide 6 is the homopolymer of caprolactam. Copolyamides based on caprolactam, in the context of the present invention, are copolyamides which contain at least 50 wt. % of monomer units derived from caprolactam. In addition, these copolyamides based on caprolactam contain other repeating units linked via amide groups. For example, these repeating units may be those which are derived from adipic acid and hexamethylene diamine, that is polyamide 6,6 units. They may also be other repeating units which are derived from other dicarboxylic acids and other diamines. Or they may be repeating units which are derived from aminocarboxylic acids, for example the repeating units in polyamide 11 or polyamide 12.

(co)polyamides may be prepared by a number of processes. For example, they may be prepared by hydrolytic polymerisation of caprolactam. This is the most important industrial-scale process. It is also the process which is preferred according to the present invention. Furthermore, they may be prepared by alkaline lactam polymerisation. The processes for preparing (co)polyamides are described, for example, in the manual mentioned above, Kunststoff-Handbuch, vol. 3 "Technische Thermoplaste", section 4 "Polyamide", on pages 22 to 75.

(co)polyamides are generally prepared by the hydrolytic polymerisation of caprolactam. If copolyamides based on caprolactam are intended to be prepared, the comonomers required are also added. The comonomers are preferably either a mixture of dicarboxylic acids and diamines or aminocarboxylic acids or lactams.

Hydrolytic polymerisation, as is described, for example, in the manual mentioned above, Kunststoff-Handbuch, vol. 3 "Technische Thermoplaste", section 4 "Polyamide", in sub-section 2.2.2.2.4, is generally performed as a polymerisation under atmospheric pressure by adding usually 1 to 5 wt. % of water at temperatures of usually 240 to 270° C. with the exclusion of atmospheric oxygen. Reaction may be started with water-eliminating compounds such as aminocarboxylic acids or AH salt (salt of adipic acid and hexamethylene diamine). It is usually started with water. The molecular weight of the polyamide is predetermined by the water content, but in practice is normally stabilised by regulators, for example by carboxylic acids or amines.

(co)polyamides are usually prepared continuously. This continuous preparation usually takes place in vertical reactors, so-called VK tubes (VK=simplified continuous). The following procedure is normally used: The VK tube is filled from the top with aqueous caprolactam (optionally together with comonomers and optionally together with further auxiliary substances such as e.g. molecular weight regulators). Excess water is distilled off here in order to achieve a sufficiently high molecular weight. The molten material then flows through the tube in usually 15 to 30 hours at atmospheric pressure, wherein it is maintained at a temperature between usually 240 and 270° C. At the end of the VK tube, the molten polyamide is forced into a water-bath through round-section dies as threads, for example using a gear pump, cooled and then granulated.

Low molecular weight compounds are produced as secondary products during the preparation of (co)polyamides. These are in particular oligomeric compounds which are produced from caprolactam and optionally also comonomers. These low molecular weight compounds are detrimental to the general properties of (co)polyamides and are therefore usually removed. Cyclic dimers of caprolactam in particular exert a detrimental effect on the general properties of (co)polyamides.

The low molecular weight fractions lead to products which are prepared from polyamides, such as e.g. injection moulded items or films and the like, being of poor quality because the low molecular weight fractions diffuse to the surface and form a greasy film there. In addition, low molecular weight fractions which diffuse to the surface lead to a deterioration in the surface quality of products made of polyamides. The gloss is reduced and the colour itself is impaired.

Polyamides which are intended to be processed to form films require an especially low concentration of low molecular weight compounds. Immediately after polymerisation, polyamide 6 and copolyamides based on caprolactam typically contain a proportion of low molecular weight compounds (caprolactam and its oligomers and optionally oligomers of comonomers) of more than 5 wt. %. Polyamides which are intended to be processed to form injection moulded goods should usually have a concentration of low molecular weight compounds of less than 1 wt. %, preferably less than 0.5 wt. %. Even higher requirements are usually placed on polyamides which are intended to be processed to form films. In this case, a concentration of low molecular weight compounds of 0.1 wt. %, preferably 0.05 wt. %, should not be exceeded.

The low molecular weight compounds may be removed, for example, by extraction. Extraction is usually performed using water or liquids which contain mainly water.

After polymerisation and subsequent extraction, the polyamide 6 or copolyamide based on caprolactam obtained is usually dried. This takes place, for example, at temperatures between 90 and 130° C. in a stream of an inert gas. Nitrogen may be used, for example. The molecular weight of the polyamide may be increased for special applications, by so-called post-condensation, by increasing the drying temperature to 180 to 190° C.

Instead of the one-step VK tube mentioned above, plants with multi-step VK tubes or plants incorporating an upstream pressure-less prepolymerisation step may be used.

According to the prior art, extraction of (co)polyamides is performed batchwise or continuously with water at temperatures which are below the boiling point of water at atmospheric pressure (i.e. below 100° C.).

The processes disclosed in the prior art for preparing polyamide 6 and copolyamides based on caprolactam which include extraction of polyamide 6 or of copolyamides based on caprolactam, have disadvantages. One disadvantage of the known processes is in particular that a high residence time is required in the extraction devices in order to undershoot a certain concentration of the low molecular weight fraction in the extracted polyamide. That means that the space-time yield for the extraction process is low. In addition, the results of extraction by the known industrial processes are frequently not good enough. In particular, the proportion of low molecular weight substances left in the polyamide is too high. In particular, the proportion of cyclic dimers of caprolactam left in the polyamide is too high.

In addition, processes known from the prior art for extracting have the disadvantage that they require too large an amount of water per unit weight of the polyamide being extracted. Smaller amounts of water for extraction are desirable because this would simplify the process, because it would enable the equipment used to be designed on a smaller scale and because the cost of the process would be less. It is advantageous to perform the extraction process in a counterflow system. Since the density of polyamide 6 and of copolyamides based on caprolactam is greater than the density of water or of aqueous liquids which are used for extraction, counterflow extraction is performed in such a way that the polyamide moves downwards under the effects of gravity, whereas the liquid which is used for extraction (usually water) is passed upwards in counterflow to the polyamide and against gravity. Using this procedure, there is the disadvantage that, when using small amounts of water per unit weight of polyamide, the loading of the water with the low molecular compounds being extracted, at the end of extraction procedure, is higher the smaller the amount of water used. This loading with low molecular weight compounds leads to an increase in the density of the mixture of water and low molecular weight compounds being extracted. With the counterflow procedure described above, this results in the liquid layer with lower density (water with a small proportion of compounds being extracted) being underneath liquid layers with a higher density (water with a high proportion of low molecular weight compounds being extracted). This in turn results in disadvantageous back-mixing because the liquid layers with higher density which lie on top break through into the liquid layers with lower density lying underneath due to the effects of gravity. The counterflow process is impaired in this way. The effectiveness of the extraction procedure decreases. According to the invention, therefore, those processes are preferred which avoid the problem of impairing extraction due to the density difference produced during the extraction procedure, as described above.

The time-space yield in the context of the present invention is understood to be the throughput of polyamide through a device for extracting the polyamide per unit of time and per unit of volume in the device.

DETAILED DESCRIPTION OF THE INVENTION

Accordingly, the object of the invention is to provide an improved process for the extraction of (co)polyamides which overcomes the disadvantages of the prior art mentioned above and which enables extraction to be performed with a high space-time yield and thus the production, after extraction, of polyamide having a reduced concentration of low molecular weight substances, in particular caprolactam and oligomers.

This object is achieved by a process for extracting polyamide 6 or copolymers based on caprolactam, wherein polyamide 6 or copolyamide(s) based on caprolactam is extracted with a liquid which contains at least 80 wt. % water at a temperature which is above the boiling point of this liquid at atmospheric pressure.

Furthermore, the present invention includes a device for extracting polyamide or copolyamides based on caprolactam, including a preextractor (1) and a pressurised extractor (2) and an injector (5) which is downstream of the preextractor, and with which the polyamide being extracted may be conveyed from the preextractor to the pressurised extractor.

Furthermore, the present invention provides a device for preparing (co)polyamides including a device according to the invention for extracting (co)polyamides.

Performing the extraction procedure at a temperature which is above the boiling point of the liquid at atmospheric pressure, as is the case in this extraction process, has the result that the extraction has to be performed under elevated pressure so that the extraction liquid does not evaporate.

In the context of the present invention, the phrase "under elevated pressure" means that the pressure is greater than 1 bar.

The process according to the invention has many advantages. The extraction process according to the invention proceeds with a high space-time yield. The extraction process according to the invention requires only small amounts of water per unit weight of polyamide. The extraction process leads to a polyamide 6 or a copolyamide based on caprolactam with a very small proportion of low molecular weight contaminants. In particular, the proportion of cyclic dimers of caprolactam in the extracted polyamide 6 or extracted copolyamide based on caprolactam is very low. Due to the low space-time yield, the extraction process may be performed on an industrial scale in small devices. Accordingly, the extraction process according to the invention is more economically viable and more cost-beneficial than the processes known from the prior art. Furthermore, the process according to the invention has the advantage that the (co)polyamides, which are usually supplied to the extraction process in the form of granules, do not stick together or form lumps during extraction, as usually takes place when (co)polyamides are brought into contact with aqueous liquids over a long period. The process according to the invention achieves the last-mentioned advantage by deliberately restricting the upper temperature reached so that adherence or the formation of lumps does not occur.

The process for extraction according to the invention has the advantage, in the event that it is performed in a counterflow system, that it is not impaired by disadvantageous back-mixing due to density differences in the extraction liquid.

Reducing the water consumption during extraction is also advantageous because the water has to be reprocessed after extraction. This is usually achieved by evaporating off the water. The water distilled off may then be reused as fresh water for the extraction process. The highly concentrated mixture remaining in the distillation vessel, which contains water and caprolactam and its oligomers and other low molecular weight compounds, may either be supplied to the polyamide preparation process or has to be disposed of as waste.

The device for extraction according to the invention has many advantages. A continuous extraction process is facilitated without producing the problems associated with back-mixing due to density differences.

The extraction device according to the invention enables high space-time yields, low residual concentrations of low molecular weight compounds after extraction and prevents adherence or the formation of lumps in the polyamide during extraction.

The process according to the invention is preferably performed continuously.

The polyamide 6 or copolyamide based on caprolactam and the liquid are preferably passed in counterflow to each other.

The polyamide 6 or copolyamide based on caprolactam is preferably moved downwards under the effects of gravity and the liquid in counterflow thereto is preferably passed upwards against gravity.

The difference in density between the liquid at the start of the extraction process and at the end of the extraction process is preferably kept sufficiently small to prevent from occurring the disadvantageous back-mixing of the liquid against the direction of flow.

Keeping this density difference small is preferably achieved by performing the extraction in two steps, wherein in a first step, which may also be performed below the boiling point of the liquid, some of the extractable constituents are removed so that in the second step, which is performed at a temperature above the boiling point of the liquid, the density difference remains small, even in the case of a low ratio between the weight of the water to that of polyamide.

Those processes are preferred in which the amount of liquid used per 1 kg of polyamide 6 or copolyamide based on caprolactam to be extracted is 1 to 3 kg, preferably 2 to 3 kg.

The liquid preferably contains predominantly water.

The extraction process is preferably performed at a temperature of 100 to 130° C.

Particularly preferred processes are those in which the extraction is performed at a temperature of 120° C. to 125° C. and then preferably with a weight ratio of polyamide to liquid of 1–2 kg of polyamide to 1–3 kg of water and then preferably for 10 to 14 hours.

In a preferred device, a second injector (9) is located downstream of the pressurised extractor so that the product may be conveyed out of the pressurised extractor.

In this case, a device is preferred which includes a pipe (4) to convey the liquid from the upper end of the pressurised extractor (2) to the preextractor (1).

The processes according to the invention are preferably performed in a device according to the invention.

The invention also provides a process for preparing (co)polyamides which includes extraction by one of the processes according to the invention.

Preferred polyamides according to the invention are selected from the group consisting of polyamide 6 and copolyamides based on caprolactam which contain at least 90 wt. % of monomer units based on caprolactam. The remaining 10 wt. % is preferably derived from the repeating units in polyamide 6,6, polyamide 11 or polyamide 12.

According to the invention, polyamide 6 is particularly preferred.

According to the invention, the extraction is preferably performed with a liquid, at least 80 wt. % of which is water. The extraction is preferably performed with water. Demineralised water is particularly preferred.

So-called injectors are preferably used to convey the suspensions of polyamide granules in water preferably present in the process according to the invention. Injectors are pumping compressors which operate using suction, also called ejectors. They belong to the group of water jet solid pumps. They use water as the transportation agent. The water transports the polyamide granules being conveyed. The polyamide granules leave the injector as a suspension in water. Transportation by injectors has the advantage that material may be conveyed with no problem from a region under atmospheric pressure to a region with a higher pressure. The use of other conveyance devices, such as e.g. a cellular wheel sluice, fails in the task of conveying the suspension of polyamide granules in water from a region of low pressure to a region of high pressure. The amount conveyed by injectors during the transportation process may be controlled by the water flow or by the counterpressure downstream of the injector. In the present process, pressure differences of 1 to 2 bar, in particular 1.5 bar, are typically overcome during transportation. Furthermore, injectors have the advantage that they have no moving parts and may therefore be made in a simple and cost-effective manner and exhibit little wear. Surprisingly, it is not necessary to install a metering device upstream of the injector in order to control the amount conveyed, as is required in the prior art.

It has not hitherto been disclosed, in the prior art, that it is possible to convey a suspension of plastics granules, preferably polyamide granules, in water (with water as the transportation medium) using injectors. In addition it has not been disclosed that this is also possible from regions of lower pressure to regions of higher pressure. In addition, it has not been disclosed that the amount conveyed may be controlled either with the transportation agent flow (that is with the amount of water which is supplied as transportation stream per unit of time) or else with the pressure on the side of the injector from which the suspension is taken away. The plastics granules being conveyed may be either anhydrous, that is dry, or else mixed with a small proportion of water prior to transportation.

Thus, another aspect of the present invention is:

A process for conveying a suspension of plastics granules, preferably polyamide granules in water with an injector with water as the transportation medium.

The material is preferably conveyed from areas of lower pressure to areas of higher pressure. The difference in pressures is preferably 0.5 to 5, particularly preferably 1 to 1.5 bar.

In the event that material is conveyed from regions of lower pressure to regions of higher pressure, a preferred embodiment of the process involves controlling the amount conveyed by the transportation flow of the water. Another preferred embodiment of the process in this event is that the amount conveyed is controlled by the pressure on the side of the injector from which the suspension is taken away. This may be achieved, for example, by using a pressure retention valve so that controlling the transportation may take place no matter what the pressure difference is between the region from which the material is conveyed and the region to which it is conveyed.

The drawings represent preferred embodiments of the present invention.

The figure shows a preferred device according to the invention for extracting (co)polyamides.

Polyamide granules 3 from the polymerisation process are supplied to the preextractor 1 which is operated under atmospheric pressure. Water 4 is used as the extraction medium, this arising from pressurised extractor 2. The polyamide granules, after separation of the water in device 7, is supplied to pressurised extractor 2 which is operated with water 8 in counterflow to the polyamide granules, via injector 5 which is operated with water 6 as the transportation medium. The extracted polyamide is discharged from the pressurised extractor via a second injector 9 and taken to be dried. The amount conveyed by the injectors may be controlled by the flow of transportation medium or by the pressure in the pipe which is used to take away the suspension. For this purpose, pressure retention valves are incorporated in these pipes (not shown in the drawing).

The device in accordance with the figure has the advantage that, due to the removal of some of the low molecular weight compounds which occurs in preextractor 1, pressurised extractor 2 does not exhibit the disadvantage of back-mixing due to density differences, even with a low weight ratio of water to polyamide.

EXAMPLES 1 AND 2

The following examples 1 and 2 were conducted in a device in accordance with the figure under continuous operation. The numerical values cited are ranges which were passed through during the course of the trials. Polyamide 6 with a concentration of low molecular weight compounds (extract) of about 8.5 to 10 wt. % was supplied to the preextractor, which was operated at 95° C. and atmospheric pressure. The residence time in the preextractor was 3 hours.

EXAMPLE 1

After passing through the preextractor, the polyamide was taken to the pressurised extractor which was operated at 100 to 120° C. The residence time in the pressurised extractor was 6 hours. The ratio of water to polyamide was 1.3 to 1. The extract concentration after the pressurised extractor was 0.3 to 0.6 wt. %. The dimer concentration dropped from 0.6 to 1 wt. %, prior to the preextractor, to 0.075 to 0.3 wt. %, after the pressurised extractor.

EXAMPLE 2

After passing through the preextractor, the polyamide was taken to the pressurised extractor which was operated at 120 to 125° C. The residence time in the pressurised extractor was 10 to 14 hours. The ratio of water to polyamide was 2.5 to 1. The extract concentration after the pressurised extractor was 0.25 to 0.4 wt. %. The dimer concentration dropped from 0.4 to 0.8 wt. %, prior to the preextractor, to 0.01 to 0.03 wt. %, after the pressurised extractor.

Examples 1 and 2 show that a high-quality extraction process, which is sufficient for conventional applications in the injection moulding area, may be achieved even with a low water input. The increase in amount of water, temperature and residence time in example 2 provides an extraction process quality which is suitable for applications in the foodstuffs packaging films area where particularly low concentrations of extract are required.

Other Examples

Test Series 3 to 6

Laboratory scale experiments performed on the extraction of polyamide 6 (PA 6) with water and caprolactam-containing water are described in the following.

These experiments demonstrate the advantages of the process according to the invention and the device according to the invention.

The experiments relate to determining the rate of extraction of the cyclic dimer of caprolactam from vacuum delactamised PA 6, as compared with unextracted PA 6. Vacuum delactamised means that some of the lactam has been removed from the PA 6 by distillation under vacuum at elevated temperature.

The results of the experiments may be summarised as follows:

The rate of extraction of the dimer and higher oligomers from PA 6, from which most of the monomeric caprolactam has been removed (vacuum delactamised PA 6), depends strongly on the temperature. In comparison to the rate of extraction of oligomers from caprolactam-containing (unextracted) PA 6, the following picture is obtained: at an extraction temperature of 95° C., the dimer is extracted from vacuum delactamised PA 6 much more slowly than from unextracted PA 6; at an extraction temperature of 125° C., however, extraction of the oligomers proceeds equally rapidly from both types of PA 6.

This result is important for a two-step extraction design that contains preextraction of a large proportion of the caprolactam and subsequent counterflow extraction under elevated pressure for final extraction which should reduce in particular the proportion of oligomers to the required extent. This type of extraction design has the advantage that the back-mixing problem which occurs during one-step aqueous extraction (caused by the density gradients), does not take place. This means that a lower specific water consumption per unit of weight of PA 6 being extracted may be achieved, which results in the final effect of saving energy and increasing the space-time yield for the extraction process.

According to the present results, such an extraction design may be realised because extraction of the dimer proceeds sufficiently rapidly, even from delactamised PA 6. Instead of an aqueous preextraction process, a lactam evaporation or vacuum delactamisation process is also possible.

Test Series 3

Extraction of Vacuum Delactamised Polyamide 6 at 95° C.

50 g of vacuum delactamised PA 6 and 500 g of water were heated to 95° C., with stirring, for 0.5, 1, 2, 4 and 8 hours. The granules were separated by filtering under suction and washed with 100 g of water. The concentration of monomer and dimer in the dried granules was determined by HPLC. The results are given in the following table:

TABLE 1

| extraction of delactamised PA 6 at 95° C. (test series 3) | | |
|---|---|---|
| Extraction time Hours | Caprolactam wt. % | Dimers wt. % |
| zero sample | 0.93 | 0.46 |
| 0.5 | 0.61 | 0.49 |
| 1 | 0.48 | 0.43 |
| 2 | 0.38 | 0.41 |
| 4 | 0.23 | 0.34 |
| 8 | 0.11 | 0.28 |

Test Series 4

Extraction of Vacuum Delactamised PA 6 at 125° C.

50 g of vacuum delactamised PA 6 and 500 g of water were heated to 125° C. in an autoclave for 0.5, 1, 2, 4 and 8 hours. Processing was performed in the same way as in test series 3. The results for determining the concentration of monomer and dimer are given in the following table:

TABLE 2 extraction of delactamised PA 6 at 125° C. (test series 4)

| Extraction time Hours | Caprolactam wt. % | Dimers wt. % |
|---|---|---|
| zero sample | 0.93 | 0.46 |
| 0.5 | 0.37 | 0.40 |
| 1 | 0.087 | 0.19 |
| 2 | 0.061 | 0.14 |
| 4 | 0.054 | 0.08 |
| 8 | 0.042 | 0.036 |

Test Series 5

Extraction of Unextracted PA 6 at 95° C.

50 g of polyamide (not extracted) and 500 g of water were heated to 95° C., with stirring, for 0.5, 1, 2, 4 and 8 hours. Processing was performed in the same way as in test series 3. The results for determining the concentration of monomer and dimer are given in the following table:

TABLE 3 extraction of unextracted PA 6 at 95° C. (test series 5)

| Extraction time Hours | Caprolactam wt. % | Dimers wt. % |
|---|---|---|
| zero sample | 5.90 | 0.36 |
| 0.5 | 2.50 | 0.17 |
| 1 | 1.90 | 0.16 |
| 2 | 1.10 | 0.14 |
| 4 | 0.58 | 0.11 |
| 8 | 0.34 | 0.07 |

Test Series 6

Extraction of Unextracted PA 6 at 125° C.

50 g of polyamide (not extracted) and 500 g of water were heated to 125° C. in an autoclave for 0.5, 1, 2, 4 and 8 hours. Processing was performed in the same way as in test series 3. The results for determining the concentration of monomer and dimer are given in the following table:

TABLE 4 extraction of unextracted PA 6 at 125° C. (test series 6)

| Extraction time Hours | Caprolactam wt. % | Dimers wt. % |
|---|---|---|
| zero sample | 5.90 | 0.36 |
| 0.5 | 0.57 | 0.097 |
| 1 | 0.36 | 0.073 |
| 2 | 0.32 | 0.053 |
| 4 | 0.30 | 0.037 |
| 8 | 0.26 | 0.024 |

Other Examples

Test Series 7 et seq.

Test series 7 to 9 relating to extraction under elevated pressure were performed in the temperature range 95 to 125° C. 125° C. corresponded to an overpressure of about 2.5 bar. The starting material in these test series was unextracted PA 6, as it is produced after polymerisation. The weight ratio of PA 6 being extracted to extraction water of 1 to 10 resulted in only a slight degree of enrichment of monomers and oligomers in the extraction medium with continuing extraction, so the course of extraction was determined primarily by the kinetics of extraction and the partition equilibrium of monomers and oligomers between granules and extraction medium was of importance only in the late phase of extraction.

Test Series 7

Extraction of Unextracted PA 6 at 95° C.

50 g of polyamide (unextracted) and 500 g of water were heated to 95° C., with stirring, for 0.5, 1, 2, 4 and 8 hours. The granules were separated by filtering under suction and washed with water. The concentration of monomer and dimer in the granules, dried at 90° C., was determined by HPLC. The results are given in the following table:

TABLE 5 extraction of unextracted PA 6 at 95° C.

| Extraction time hours | Caprolactam wt. % | Dimers wt. % |
|---|---|---|
| zero sample | 5.90 | 0.36 |
| 0.5 | 2.50 | 0.17 |
| 1 | 1.90 | 0.16 |
| 2 | 1.10 | 0.14 |
| 4 | 0.58 | 0.11 |
| 8 | 0.34 | 0.07 |

Test Series 8

Extraction of Unextracted PA 6 at 110° C.

50 g of polyamide (not extracted) and 500 g of water were heated to 110° C. in an autoclave for 0.5, 1, 2, 4 and 8 hours. Processing was performed in the same way as in test series 7. The results for determining the concentration of monomer and dimer are given in the following table:

TABLE 6 extraction of unextracted PA 6 at 110° C.

| Extraction time hours | Caprolactam wt. % | Dimers wt. % |
|---|---|---|
| zero sample | 5.90 | 0.36 |
| 0.5 | 1.30 | 0.13 |
| 1 | 0.75 | 0.10 |
| 2 | 0.56 | 0.10 |
| 4 | 0.35 | 0.07 |
| 8 | 0.31 | 0.06 |

Test Series 9

Extraction of Unextracted PA 6 at 125° C.

50 g of polyamide (not extracted) and 500 g of water were heated to 125° C. in an autoclave for 0.5, 1, 2, 4 and 8 hours. Processing was performed in the same way as in test series 7. The results for determining the concentration of monomer and dimer are given in the following table:

TABLE 7 extraction of unextracted PA 6 at 125° C.

| Extraction time hours | Caprolactam wt. % | Dimers wt. % |
|---|---|---|
| zero sample | 5.90 | 0.36 |
| 0.5 | 0.57 | 0.097 |
| 1 | 0.36 | 0.073 |
| 2 | 0.32 | 0.053 |
| 4 | 0.30 | 0.037 |
| 8 | 0.26 | 0.024 |

It is quite clear from test series 7 to 9 that increasing the extraction temperature from 95° C. to 110° C. and then to 125° C. increases the rate of extraction considerably. This applies equally to monomeric caprolactam and to the dimer. Thus, under the test arrangements given, at 125° C., after an extraction time of one hour a caprolactam concentration of 0.36% and a dimer concentration of 0.073% is achieved, which is the extraction quality corresponding to injection moulding quality. In contrast to that, comparable values are obtained only after 4 to 8 hours at an extraction temperature of 95° C.

Test series 7 to 9 show that the rate of extraction increases greatly on passing from 95 to 110 and then to 125° C. At temperatures of 135° C., the granules formed lumps. Therefore extraction could not be performed at 135° C.

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A process for purifying (co)polyamides comprising subjecting a (co)polyamide to liquid-extraction at a temperature which is above the boiling point of the liquid at atmospheric pressure, said (co)polyamide being a member selected from the group consisting of polyamide 6 or copolyamide based on caprolactam, said liquid containing water in an amount of at least 80 percent relative to its weight.

2. The process according to claim 1 characterized in that it is continuous.

3. The process of claim 2 wherein the liquid and the polyamide are in counterflow one to the other and wherein the liquid flows against the force of gravity and wherein there is formed a difference in density between the liquid at the start and that at the end of the liquid-extraction said difference being sufficiently small to substantially preclude back-mixing of the liquid in the opposite direction from its direction of flow.

4. A process according to claim 3, wherein the difference is achieved by performing the extraction in two steps, wherein the first extraction step optionally conducted below the boiling point of the liquid, a portion of the constituents is extracted, and wherein the second step is performed at a temperature above the boiling point of the liquid.

5. A device capable of performing the process of claim 4, comprising a preextractor and a pressurized extractor, wherein a second injector is located downstream of the pressurised extractor and with which the material may be conveyed out of the pressurised extractor.

6. A device according to claim 5, containing a pipe (4) to transport the liquid from the upper end of the pressurised extractor (2) to the preextractor (1).

* * * * *